Patented Jan. 5, 1937

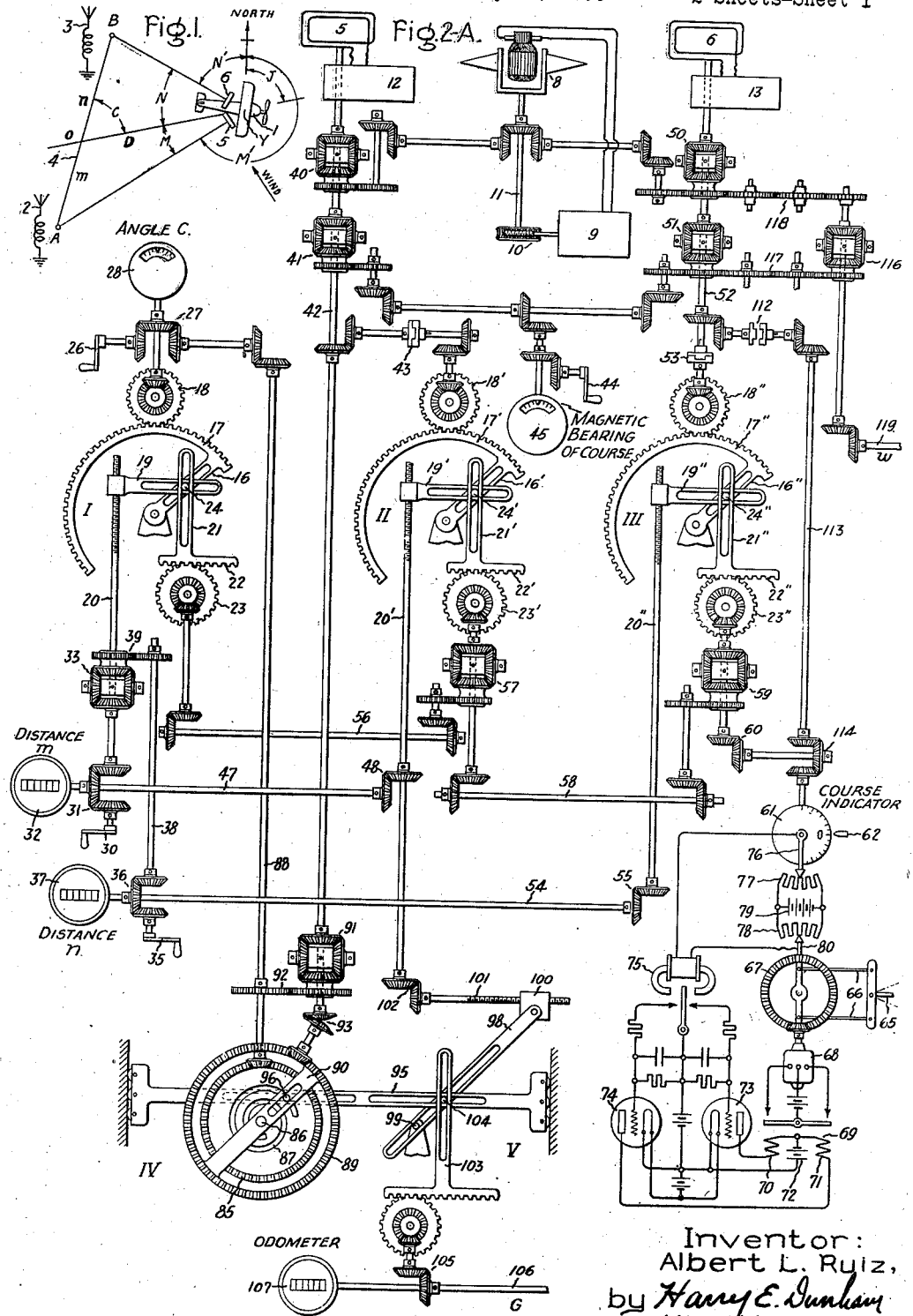

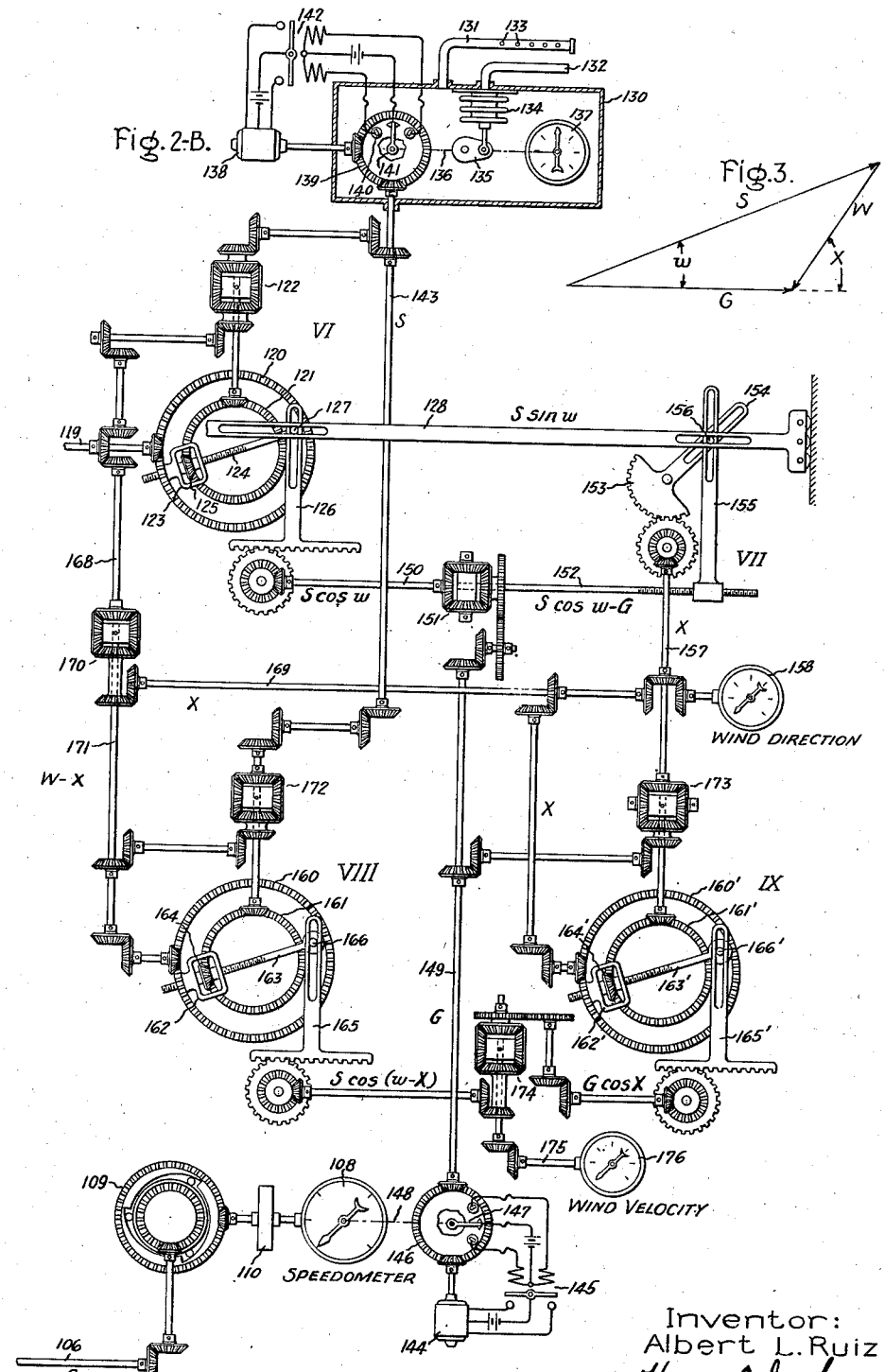

2,066,949

UNITED STATES PATENT OFFICE 2,066,949

CRAFT NAVIGATING APPARATUS

Albert L. Ruiz, Schenectady, N. Y., assignor to General Electric Company, a corporation of New York Application May 16, 1936, Serial No. 80,099

11 Claims. (Cl. 73—151)

My invention relates to moving craft, such as air and water craft, and particularly to apparatus carried thereby by means of which the craft may be steered manually or automatically to keep a straight course and by means of which the pilot may obtain information useful in the navigation of the craft.

In the copending application of Earl E. Libman, Serial No. 80,100, filed May 16, 1936 and assigned to the same assignee as the present application there is disclosed a system by which a craft may be steered on a straight course by the use of a plurality of radio transmitters arranged laterally of the course and at known distances from the course measured on the line joining the transmitters, the angle between the line and the course also being known. The craft carries radio receiving apparatus including directive antennae each arranged to be responsive to the waves from one transmitter and to be maintained oriented with respect thereto. In that application, it is shown that as long as the craft is on the course the relation of the said known quantities and the angles between the course and the lines joining the craft with the transmitters may be expressed by a trigonometric equation of which one side is zero.

One object of my invention is to provide improved apparatus to be carried by the craft for continuously solving such an equation whereby an indication may be given to the pilot when the craft is on the course or how much deviation may have occurred and whereby the craft may be steered automatically to keep it on the course.

Another object of my invention is the provision of improved apparatus for giving various other indications of assistance to the pilot in the navigation of the craft, such as the distance traversed by the craft, the speed thereof, the direction of the wind and the wind velocity.

My invention will be better understood from the following description taken in connection with the accompanying drawings, and its scope will be pointed out in the appended claims.

In the drawings Fig. 1 is a diagram showing one relative arrangement of the course, the sources of radiant energy, and the craft, Figs. 2A and 2B which belong together show one form of apparatus illustrating my invention and Fig. 3 is a velocity diagram.

In Fig. 1 I have represented the craft, such as the airplane at 1, which it is desired to have travel on a straight course represented by the line D, which line makes the angle J with the magnetic north, the direction of the wind being represented by an arrow. At opposite sides of the course D and at the points A and B are two sources of radiant energy, such, for example, as radio transmitters which are represented diagrammatically at 2 and 3 respectively, which transmitters operate on different frequencies. The line 4 connecting the two transmitters intersects the course D at the point o and makes an angle with the course D which is known and which is represented by C. The distances between the points A and B occupied by the transmitters and the course as measured on the connecting line 4 are known and are represented respectively by $m$ and $n$. The constantly varying angles between the course and the lines connecting the craft with the points A and B are represented by M and N respectively.

In the aforesaid application, it is shown that as long as the craft remains on the course D the sum of distances $m$ and $n$ times the cotangent of the angle C minus the distance $m$ times the cotangent of the angle M plus the distance $n$ times the cotangent of the angle N equals zero. Expressed in the form of an equation this relation is as follows:

$$(m+n) \cot C - m \cot M + n \cot N = 0 \quad (1)$$

In the same application it is shown also that the distance, represented by D, travelled by the craft is equal to $m$ times the sine of angle C minus the angle M divided by the sine of angle M which expressed in the form of an equation is:

$$D = \frac{m \sin (C-M)}{\sin M} \quad (2)$$

Since the sine and the cosecant are reciprocals Equation (2) obviously may be written thus:

$$D = m \sin (C-M) \operatorname{cosec} M \quad (3)$$

From the above Equation (1) it will be seen that for every point Y occupied by the craft on the line D the equation is satisfied; hence if the values of the various quantities comprising the left-hand side of this equation are substituted therein and the algebraic sum thereof equals zero, the pilot knows that the craft is on the course. If the craft deviates to one side of the course the left side of the equation no longer will equal zero but will equal some positive quantity depending upon the amount of the deviation. Likewise if the craft deviates to the other side of the course, the left side of the equation will equal some negative quantity dependent upon the amount of the deviation.

I shall now describe apparatus which I have devised for continuously solving the above equations, which apparatus is provided with means for initially setting into it the known quantities and for continually feeding into it the variable quantities. The apparatus is provided with an indicator by which the pilot may observe when the equation is satisfied and if not satisfied whether the craft has deviated, due to drift or other causes, to the right or to the left of the course. I have shown the apparatus including means for automatically steering the craft so as to cause it to travel on the straight course thereby compensating for drift or other factors which may cause it to deviate therefrom. I have also provided means for indicating the distance travelled by the craft, the speed of travel of the craft, the direction of the wind, and the wind velocity.

The craft 1, see Fig. 1, is provided with a plurality of radio receivers each tuned to the frequency of one of the two transmitters 2 and 3 and each provided with a directive receptor having means whereby it is automatically maintained oriented with respect to the transmitter to the frequency of which the corresponding receiver is tuned. These directive receptors are represented as antennae in the form of the loops 5 and 6, loop 5 being maintained oriented with respect to the transmitter 2 at the point A in response to energy received therefrom and loop 6 being maintained oriented with respect to the transmitter 3 at the point B, likewise in response to energy received from the latter transmitter. As noted above, the angle between the course and the line AY is represented by M; likewise the angle between the course and the line BY is represented by the angle N. It will be understood that as the craft travels on its course and the angles M and N continually change, the angles made by the loops 5 and 6 also continually change, the angles of the loops 5 and 6 serving as a measure of the angles M and N respectively.

The craft also is provided with a compass such for example as a magneto compass represented at 8 in Fig. 2—A and this compass is provided with suitable means such as that disclosed in the Becker Patent 1,991,443 February 14, 1935, for maintaining the pole pieces thereof in an east and west position in response to the voltage produced in the armature when the pole pieces are deflected from that position. This apparatus is represented in its entirety by the rectangle 9 which connects through the gearing 10 and the shaft 11 with the pole piece mounting of the compass. The means by which the loops 5 and 6 are maintained oriented with respect to the transmitters 2 and 3 respectively are like that disclosed in the above-mentioned patent for steering the craft and such means are represented respectively by the rectangles 12 and 13. These means, it will be understood, operate directly on the shafts carrying loops 5 and 6 in place of the cord and pulley 50 of the aforesaid patent.

I shall now describe specifically one form of apparatus which I have devised into which the above-mentioned known fixed quantities may be initially set and into which the changing quantities may be continuously fed, which apparatus may be used for continuously solving Equation 1. I shall also describe a form of apparatus for automatically effecting the steering of the craft to maintain it on the course in accordance with the solving of that equation.

The apparatus comprises in part three similar mechanisms I, II and III constructed and connected to compute the first, second, and third terms respectively of Equation (1). The respective mechanisms include slotted pivoted arms 16, 16′ and 16″ having at their outer ends the gear segments 17, 17′ and 17″ by which the arms are rotated, these gear segments being in mesh with pinions 18, 18′ and 18″. Intersecting the arms are the slotted horizontal slides 19, 19′ and 19″ which are arranged to move in a vertical direction only and which are threaded on the screws 20, 20′ and 20″ by which they are moved. Also intersecting with the arms are the slotted vertical slides 21, 21′ and 21″ which are arranged to move in a horizontal direction only and which have portions forming racks 22, 22′ and 22″ which engage the gears 23, 23′ and 23″. The arm and the two-slides are caused to intersect at a common point by the pins 24, 24′ and 24″. It will be seen that with this construction if an arm is moved to a given position and the horizontal slide is moved to a given position, the vertical slide must assume a position which is a function of the positions of the other two members.

The known angle C is initially set into the mechanism I by rotating the crank 26 which connects through the gearing 27 with the gear 18 and with the angle indicator 28 until the desired angle is shown by the indicator. The arm 16 of mechanism I is thereby set at the desired angle C.

The distance $m$ is set into mechanism I by rotating the crank 30 which connects through the gearing 31 with the indicator 32 and through the differential gear 33 with the shaft 20. The resulting rotation of the screw 20 moves the slide 19 to a position in accordance with the movement of the crank 30 as indicated by the indicator 32. Distance $n$ is also set into the mechanism by rotating the crank 35 which through the gearing 36 operates the indicator 37 and through the shaft 38, the spur gearing 39 and the differential gear 33 also turns the screw 20 in the same direction as before so as to move the slide 19 an additional amount in accordance with the distance $n$, as indicated by the indicator 37. It will be readily seen that since the position of the arm 16 represents the angle C and the position of the slide 19 represents the distance $m$ plus $n$, the position of the slide 21 will represent the product of $m$ plus $n$ and the cotangent of the angle C. Thus the resulting movement of the gear 23 is proportional to $(m+n)$ cot $C$ which is the first term of Equation (1).

Referring now to mechanism II, the loop 5 will have been moved by the orienting means 12 through the angle between the craft axis and the line connecting the craft with the point A. Through the operation of the magneto compass 8 the angle of the craft axis with respect to north is added to the above-mentioned angle by means of the differential gear 40, the sum being equal to the angle M′. By turning the crank 44 the proper amount as shown by the indicator 45 the magnetic bearing of the course, namely angle J, is set into the mechanism. This angle J is subtracted from angle M′ by the differential gear 41 the difference $M'-J$ which is the same as $180°-M$ being transmitted to segment 17′ through the shaft 42, clutch 43, and pinion 18′. Thus the angle of arm 16′ is equal to 180°−$M$.

The distance $m$ is set into mechanism II through the shaft 47 which through the gearing 48 rotates the screw 20′, to move the slide 19′. Since the angle of the arm 16′ is equal to $180°-M$ and the position of the slide 19′ represents the distance $m$, the position of the slide 21′ will represent the product of $m$ and the minus cotangent of M. Thus the resulting movement of the gear 23′ is proportional to −$m$ cot $M$ which is the second term of Equation (1).

Referring now to mechanism III the loop 6 will be moved by the orienting means 13 through the angle between the craft axis and the line connecting the craft with the point B. Through the operation of the magneto compass 8 the angle of the craft axis with respect to north is subtracted from the above-mentioned angle by means of the differential gear 50, the difference being equal to the angle N'.

The magnetic bearing of the course having already been set in the apparatus by turning the crank 44, the angle J is added to the angle N' by the differential gear 51, the sum $N'+J$ which is the same as $180°-N$ being transmitted to segment 17" through the shaft 52, clutch 53 and pinion 18". Thus the angle of the arm 16" is equal to $180°-N$. The distance $n$ is set into mechanism III through the shaft 54 which through the gearing 55 rotates the screw 20" to move the slide 19". Since the angle of the arm 16" is equal to $180°-N$ and the position of the slide 19" represents the distance $n$, the position of the slide 21" will represent the product of $n$ and the minus cotangent of $N$. Thus the resulting movement of the gear 23" is proportional to $-n \cot N$ which is the negative of the third term of Equation (1).

By means of the shaft 56 and the differential gear 57 the movement of gear 23 of mechanism I is added to that of gear 23' of mechanism II. Likewise by means of shaft 58 and the differential gear 59, from the sum of the movements of gears 23 and 23' is subtracted the movement of gear 23" of mechanism III. The final algebraic sum is transmitted through the gearing 60 to the dial 61 of the course indicator having the fixed pointer 62. If the craft is on the course the zero mark of the dial 61 will stand opposite the pointer 62 and thus indicate to the pilot that the craft is travelling on the course. If, on the other hand, the zero mark is at either side of the pointer, the pilot knows that the craft has deviated from the course, the direction and the amount of the deviation being indicated by the dial. With that information he may turn the rudder to bring the craft back on the course.

The craft may be steered automatically to keep it on the course by controlling the rudder in accordance with the angular position of the dial 61. The means which I have illustrated for so moving the rudder is to a certain extent like that disclosed in the above-mentioned Patent 1,991,443. In the present case the rudder 65 is connected by the cables 66 with the gear 67 which is arranged to be moved in one direction or the other from the midposition illustrated by the reversible motor 68. The direction of rotation of this motor is controlled by the relay 69 having the two windings 70 and 71 which are connected to be energized by the battery 72 under the control of the discharge devices 73 and 74 respectively. These devices in turn are controlled by the polarized relay 75 in a manner similar to that of the polarized relay 20 and discharge devices 21 and 22 of the above-mentioned patent. The winding of the polarized relay 75 is arranged to be energized by current in one direction or the other in accordance with the position of the contact 76 secured to the scale 61 and arranged to move over the resistor 77. This resistor has its ends connected with the ends of a similar resistor 78 and with the ends of the battery 79. The contact 80 carried by the gear 67 and connected with the winding of the polarized relay engages the resistor 78. By this arrangement it will be seen that as long as the craft is on the course no current is supplied to the polarized relay 75. If, however, the course indicator shows a deviation of the craft to one side the movement of the contact 76 supplies current in a direction to energize relay 75 which through one or the other of the discharge tubes energizes the relay 69 in a direction to cause the motor to turn the gear 67 so as to change the position of the rudder to correct the deviation. The rheostat 78 and contact 80 constitute a follow up arrangement whereby the operation of the motor 68 operates to turn the craft through successive increments until it has reached the final position in the same manner and for the same purpose as described in the aforementioned patent. By means of the apparatus thus described the craft may be steered automatically in response to the initial setting into the apparatus of the known quantities and the continued feeding into the apparatus of the changing quantities so that the craft will be kept on the predetermined course regardless of the effect of side winds, etc.

I shall now describe apparatus which I have devised and which is operated by the above-described apparatus by which the distance travelled by the craft and the speed thereof may be indicated. Mechanism designated IV comprises the gear 85 mounted on the pin 86 and having a slot 87 therein forming a cosecant cam. The gear is connected through the shaft 88 and gears thereon with the crank 26 associated with the indicator of angle C whereby when angle C is set into the apparatus the gear and cosecant cam is rotated through an angle equal to C. Mounted concentrically with the gear 85 is the outer gear 89 which has the slotted radial arm 90. This gear 89 is rotated in the same direction as the inner gear through an angle equal to the angle C minus the angle M by means of the differential gear 91 since by this differential gear and the spur gearing 92 the movement of the shaft 42 is subtracted from that of shaft 88. This differential movement is transmitted through the gearing 93 to the outer gear 89. The relative movement between the inner and outer gears is $C-(C-M)$ which equals M. Arranged for vertical movement between two suitable guide surfaces is the slotted horizontal bar 95 and this bar, the arm 90 and the face of the cosecant cam are caused to intersect at a common point by the pin 96. Inasmuch as the relative movement between gears 85 and 89 is proportional to angle M, the distance between pins 96 and 86 is equal to the cosecant of M. Also since the gear 89 has been moved through angle $C-M$ the vertical displacement of the pin 96 and hence of the bar 95 is equal to $\sin(C-M)\csc M$.

Bar 95 being common to mechanisms IV and V, the vertical movement of this bar is communicated to mechanism V. In this mechanism the slotted link 98 is pivoted to the fixed pivot 99 adjacent one end and at the opposite end is pivoted to the nut 100 which is threaded on the screw 101. This screw connects through the gearing 102 with the screw 20' of mechanism II. By this means the distance $m$ is transmitted to the upper end of the link 98. The slide 103 which is similar to slide 21, intersects the bar 95 and the link 98, the pin 104 causing the three members to intersect at a common point. By the mechanism V the vertical displacement of the bar 95 is combined with the quantity $m$ whereby the horizontal displacement of the slide 103 is equal to $m \sin(C-M) \csc M$ which according to Equation (3) equals the distance traversed by the craft. Movement of the slide 103 may be communicated through gearing such as 105, and shaft 106 to the odometer 107 which, if desired, may be calibrated to read in miles.

Inasmuch as the loops 5 and 6 do not necessarily follow the changing positions of the transmitters 2 and 3 to which they are responsive with steady movements but may follow them rather by series of small increments, the movement of the slide 103 accordingly may be intermittent. The average rate of movement of the slide 103 is a measure of the speed of the craft and in order that I may employ a speedometer of a common form, such for example as that shown at 108, Fig. 2B, for indicating the speed of the craft, suitable means are provided for reducing the intermittent motion to a steady movement. Such means I have represented as comprising a well known form of over-running clutch 109 between which and the speedometer is the flywheel 110.

If the course to be travelled is such that it passes through one of the transmitters, for example, the transmitter 3 at the point B, then the angle N will be zero as long as the craft is on the course. In this case for course indication and automatic steering transmitter 2 and the receiver including loop 5 are not necessary, hence clutches 43 and 53 should be disconnected and quantity $n$ should be set at zero. The clutch 112 will be closed thereby establishing a direct connection between the shaft 52 and the indicator through the shaft 113 and gearing 114, the mechanisms II and III now being inoperative. Thus any change in angle of loop 6 resulting from a deviation of the craft from the course will be indicated by the indicator 61 as before. The distance travelled and the speed of the craft are obtained by mechanisms IV and V as a result of the changing angle M in the manner already described above.

I shall now describe the apparatus which I have devised for indicating to the pilot the direction and the velocity of the wind. Referring to Fig. 3 the length of the line W represents the speed of the wind relative to the ground, the length of the line G represents the speed of the craft relative to the ground, the length of the line S represents the speed of the craft relative to the wind, $w$ is the angle between S and G, and X is the angle between G and minus W. From the triangle thus formed it is evident that W may be expressed as follows:

$$W = G \cos X - S \cos(w - X) \qquad (4)$$

And also X may be expressed as follows:

$$X = \arctan \frac{S \sin w}{S \cos w - G} \qquad (5)$$

The angle $w$, which is the angle of crab of the craft, is obtained by subtracting the angle of the course relative to the north-south magnetic line from the angle of the axis of the craft relative to that line. This is done by means of the differential gear 116 the lower portion of which is connected by the spur gearing 117 with the lower portion of differential gear 51 which in turn is connected with the crank 44 by which the magnetic bearing of the course was set into the apparatus. The upper part of differential gear 116 connects through the spur gearing 118 with the lower portion of differential gear 50 and hence with magneto compass 8. The resulting movement of the shaft 119 equals the angle $w$ or angle of crab of the craft.

Referring now to Fig. 2B the mechanism VI comprises the two concentrically mounted ring gears 120 and 121, the former being geared directly to shaft 119 and the latter being geared to the same shaft 119 through the differential gear 122. The gearing by which the two ring gears are rotated from shaft 119 is such that those gears are moved through equal angles in response to a given movement of shaft 119. Hence movement of the latter shaft alone does not produce any relative movement between the two ring gears. The outer ring gear 120 is provided with the yoke 123 in which is mounted the screw 124 extending diametrically of the gear and in which also is mounted the pinion 125 which is threaded on the screw and functions as a nut to move the screw. Cooperating with the ring gears is the slide 126 mounted for horizontal movement only and provided with a vertical slot for receiving the pin 127 carried by the screw 124. Also cooperating with the ring gears is the bar 128 which is mounted for vertical movement only in a manner similar to that of bar 95 previously described. This bar has a horizontal slot which also receives the pin 127. Through the differential gear 122 movement is also transmitted to the inner ring gear 121 in accordance with the velocity of the wind with respect to the craft. Any well known form of apparatus for producing this movement may be employed. I have illustrated a simple form of apparatus for this purpose as comprising the closed air chamber 130 from which extend tubes 131 and 132. The former tube is closed at its outer end and is provided with a series of openings 133 in the side thereof. Tube 132 is open at its outer end and at the inner end connects with one end of the bellows 134 the opposite end of which connects with the crank 135 on the shaft 136. The angular position of this shaft, therefore, is responsive to the speed of the wind relative to the craft and is represented by the indicator 137. In order that the movement of shaft 136 may be employed to rotate the ring gear 121 as well as other parts of the mechanism, I employ suitable motor driven mechanism to supply the necessary power under the control of this shaft. Such a mechanism is represented as comprising the reversible motor 138 which serves to turn the gear 139 in one direction or the other under the control of shaft 136. The gear carries two spaced fixed contacts 140 and the shaft carries a cooperating movable contact 141, the contacts serving to control the direction of rotation of the motor 138 through the relay 142 in the well understood manner. By this mechanism the angular position of the shaft 143 is responsive to the velocity of the craft relative to the air. Through the differential gear 122, therefore, the ring gear 121 is moved relative to the outer ring gear 120 an amount proportional to the velocity of the craft relative to the wind. Hence the position of the pin 127 with respect to the center of the ring gears is proportional to the velocity of the craft relative to the wind which is the quantity S in Fig. 3. The horizontal displacement of the slide 126 hence is equal to S times the cosine of $w$ and likewise the vertical displacement of the bar 128 is equal to S times the sine of $w$. Before combining the movement of the bar 128 with the movement of the slide 126 by means of the mechanism VII in order to obtain the direction of the wind it is necessary to subtract from the movement of slide 126 the quantity G which represents the speed of the plane relative to the ground and which is given by the speedometer 108. I have provided a power drive controlled by this speedometer comprising a motor operated mechanism similar to that described above in connection with the apparatus for responding to the speed of the air passing the craft. It includes the reversible motor 144 controlled by the relay 145 which in turn is controlled by contacts on the gear 146 and the cooperating contact 147 on the shaft 148 of the speedometer. Movement of the shaft 149 which is geared to the gear 146 is subtracted from that of shaft 150 by the differential 151 whereby the screw 152 is turned an amount proportional to $S \cos w - G$.

Mechanism VII comprises the gear segment 153 having the slotted arm 154, the bar 128, and the slide 155 mounted for horizontal movement only. The three members 128, 154, and 155 are slotted and the pin 156 passes through all three to provide a common point of intersection. The tangent of the angle of the arm 154 is equal to the vertical displacement of bar 128 divided by the horizontal displacement of the slide 155 or $$\frac{S \sin w}{S \cos w - G}$$

From Equation (5) it will be seen that the angular displacement of arm 154 equals the arc tangent of the above quantity which equals the angle X. Movement of arm 154 is transmitted through the shaft 157 to the indicator 158 which indicates the angle X which is the direction of the wind.

The mechanisms VIII and IX by means of which the velocity of the wind is indicated are similar to mechanism VI in that they include respectively outer ring gears 160 and 160', inner ring gears 161 and 161', yokes 162 and 162' carried by the outer ring gears, screws 163 and 163' mounted in the yokes and having threaded thereon gear nuts 164 and 164', and horizontally movable slides 165 and 165' having slots engaged by pins 166 and 166' carried by the screws. Shaft 168 being geared to shaft 119 turns in accordance with the angle $w$; likewise shaft 169 being geared to shaft 157 turns in accordance with the angle X. Through the differential gear 170 movement of the shaft 169 is subtracted from that of shaft 168 whereby movement of shaft 171 is proportional to $w - X$. The movement of this shaft 171 is transmitted to both ring gears 160 and 161 through the gearing shown and the differential gear 172 whereby both gears are rotated an equal amount due to movement of the shaft 171. The inner ring gear 161 is rotated an additional amount through the differential gear 172 in accordance with the movement of shaft 143; hence the radial displacement of pin 166 from the center of the ring gears is proportional to S. The horizontal displacement of the slide 165 therefore is proportional to $S \cos(w-X)$.

In a similar manner ring gears 160' and 161' of mechanism IX are rotated in accordance with the angle X by reason of the geared connections thereto with the shaft 157. The inner ring gear is additionally moved and hence the pin 166' is displaced from the center of the ring gears an amount proportional to the movement of shaft 149 by reason of the connection therewith including the differential gear 173. Hence the displacement of the slide 165' is proportional to $G \cos X$. The movement of slide 165 is subtracted from the movement of 165' by means of the differential gear 174 and hence the movement of shaft 175 is proportional to $$G \cos X - S \cos(w-X)$$

which in accordance with Equation (4) is equal to the speed or velocity of the wind relative to the ground. This value is indicated by the wind velocity indicator 176.

In the drawings I have not attempted to show the various parts of the apparatus in their true relative proportions nor have I attempted in all cases to show the gears arranged for rotation in the proper direction or having the proper gear ratio.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States is:

1. In a system for steering a craft on a straight course employing reference points A and B located laterally of said course on a line making an angle C with the course and at distances $m$ and $n$ respectively therefrom measured on said line, the direction of the points A and B from the craft making angles M and L respectively with the course, a first, a second, and a third mechanism all of similar construction and each including a plurality of slides at right angles to each other, a rotatable arm and means for causing the slides and the arm to intercept at a common point, means for moving corresponding slides of the respective mechanisms distances proportional to the sum of distances $m$ and $n$, distance $m$, and distance $n$, means for rotating the arms of the respective mechanisms through angles equal to the angle C, the angle M and the angle L and means for summing up the resulting movements of the other slides of the mechanisms.

2. In a system for guiding a craft on a straight course employing a reference point A located at one side of the course and at a distance $m$ therefrom measured on a line making an angle C therewith, the direction of the point A from the craft making an angle M with the course, a slide mounted for movement transversely of its length, means for moving the slide a distance proportional to the product of the sine of $(C-M)$ and the cosecant of M, a link slidably connected at one portion with a fixed pivot, means for moving another portion thereof at right angles to the movement of said slide in proportion to $m$, a second slide movable at right angles to the movement of the first slide and means for causing said slides and link to intersect at a common point, the movement of said second slide being proportional to the distance traversed by the craft.

3. In a system for guiding a craft on a straight course employing a reference point A located at one side of the course and at a distance $m$ therefrom measured on a line making an angle C therewith, the direction of the point A from the craft making an angle M with the course, a slide mounted for movement transversely of its length, a cosecant cam rotatable in accordance with angle C, an arm rotatable in accordance with the difference between angles C and M, means for causing said slide, said cam and said arm to intersect at a common point, a fixed pivot, a link slidably connected therewith, means for moving one end of the link at right angles to the movement of said slide in proportion to $m$, a second slide movable at right angles to the movement of the first slide, means for causing said slides and link to intersect at a common point and a meter connected to be actuated by said second slide.

4. In a system for guiding a craft on a straight course employing a reference point A located at one side of the course and at a distance $m$ therefrom measured on a line making an angle C therewith, the direction of the point A from the craft making an angle M with the course, a slide mounted for movement transversely of its length, a rotatable cosecant cam, means for setting said cam in accordance with angle C, a rotatable arm, means for positioning said arm in accordance with the difference between angles C and M, means for causing said slide, said cam and said arm to intersect at a common point, a fixed point, a link slidably connected therewith, means for guiding one end of said link at right angles to the movement of said slide, means for setting said end in proportion to $m$, a second slide movable at right angles to the movement of the first slide, means for causing said slides and link to intersect at a common point, and a speedometer connected to be driven by said second slide.

5. In a system by which a craft may be guided on a straight course, apparatus for indicating the direction of the wind when the air speed, the ground speed and the angle of crab of the craft are known comprising a plurality of slides movable in directions at right angles to each other, a rotatable arm, means for causing said slides and arm to intersect at a common point, means for moving one of said slides in accordance with the product of the air speed and the sine of the angle of crab, and means for moving the other slide in accordance with the product of the air speed and the cosine of the angle of crab minus the ground speed of the craft, the resulting angular position of said arm indicating the direction of the wind relative to the course.

6. In a system by which a craft may be guided on a straight course in a known direction, apparatus for indicating the direction of the wind when the air speed and the ground speed of the craft are known, comprising means for subtracting the angle between the axis of the craft and the north-south magnetic line from the angle between the course and said line thus giving the angle of crab of the craft, a plurality of slides movable in directions at right angles to each other, a rotatable arm, means for causing said slides and said arm to intersect at a common point, means for obtaining the product of said air speed and the sine of said angle of crab, means for moving one of said slides in accordance with said product, means for obtaining the product of said air speed and the cosine of said angle of crab, means for obtaining the difference between the latter product and said ground speed, and means for moving the other of said slides in accordance with said difference, the resulting angular position of said arm being an indication of the angle of the wind.

7. In apparatus of the character described, mechanism for obtaining the product of a given quantity and the cosine of a given angle comprising a plurality of concentric rotatable members, a screw mounted on one of said members for longitudinal movement radially thereof, a nut on said screw carried by said one member and arranged to be rotated by the other member, means for rotating both of said members through angles equal to said given angle and means for rotating said other member in accordance with said given quantity.

8. In a system of the character described wherein the air speed of a craft traveling on a straight course and the angle of crab are known, a plurality of slides arranged for movements at right angles to each other, a plurality of concentric rotatable members, means for rotating both members through an angle equal to said angle of crab, a diametrical member mounted for longitudinal movement on one of said members, means for rotating the other of said members in accordance with said air speed, means carried by said one member and arranged to be rotated by the other member for moving said diametrical member and means for causing said slides and diametrical member to intersect at a common point, whereby the displacement of one slide is proportional to said speed times the sine of said angle of crab and the displacement of the other slide is proportional to said speed times the cosine of said angle of crab.

9. In a system of the character described wherein the air speed of a craft traveling on a straight course, the angle of crab of the craft and the ground speed of the craft are known apparatus for indicating the direction of the wind comprising a plurality of slides arranged for movements at right angles to each other, a rotatable arm, means for causing said slides and arm to intersect at a common point, means for moving one of said slides a distance proportional to the product of said air speed and the sine of said angle and means for moving the other of said slides a distance proportional to the product of said air speed and the cosine of said angle minus said ground speed, the resulting position of said arm being an indication of the direction of the wind.

10. In a system of the character described wherein the air speed of a craft traveling on a straight course, the angle of crab of the craft, and the ground speed of the craft are known apparatus for indicating the direction of the wind comprising a slide and a slidable bar arranged for movements at right angles to each other, a plurality of concentric rotatable members, means for rotating both members through an angle equal to said angle of crab, a screw mounted for longitudinal movement on and arranged diametrically of one of said members, means for rotating the other of said members in accordance with said air speed, a nut on said screw carried by said one member and arranged to be rotated by the other member, means for causing said slide, bar and screw to intersect at a common point, a second slide arranged for movement at right angles to said bar, a rotatable arm, means for causing said second slide, said bar and said arm to intersect at a common point and means for moving said second slide a distance proportional to the movement of the first mentioned slide minus said ground speed.

11. In a system of the character described wherein the air speed and the ground speed of a craft traveling on a straight course, the angle of crab and the angle of the wind are known, apparatus for indicating the velocity of the wind comprising means for producing the difference between the angle of crab and the angle of the wind, means for producing the product of the cosine of said difference and said air speed, means for producing the product of the ground speed and the cosine of the angle of the wind and means for subtracting the second of said products from the first product.

ALBERT L. RUIZ.